UNITED STATES PATENT OFFICE.

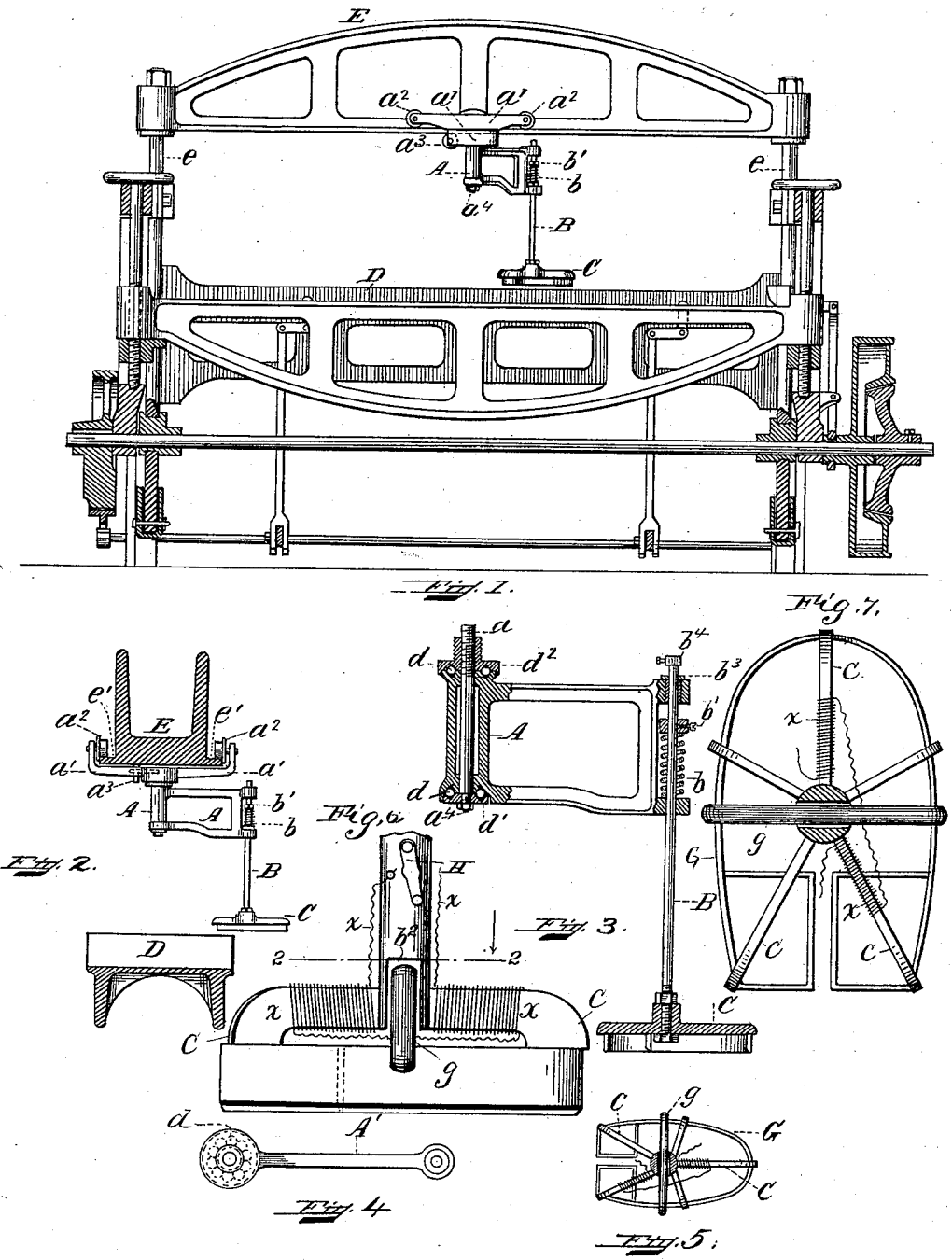

HENRY PARSONS, OF MARLBOROUGH, MASSACHUSETTS.

MACHINE FOR CUTTING LEATHER.

SPECIFICATION forming part of Letters Patent No. 630,402, dated August 8, 1899.

Application filed May 9, 1898. Serial No. 680,114. (No model.)

*To all whom it may concern:*

Be it known that I, HENRY PARSONS, of Marlborough, in the county of Middlesex and State of Massachusetts, have invented certain new and useful Improvements in Machines for Cutting Leather or other Materials, of which the following is a specification.

My present invention relates to that class of machines known as "beam dying-out machines" or "beam-presses," wherein a beam is used to force downward the dies placed under the beam and whereby the material placed on the bed of the machine under the beam is cut or died out, according to the form of the cutting die or dies used. As heretofore used the dies have been forced downward by the direct action of the beam operating on the dies.

By my present invention I interpose a spindle held by a movable arm on a carrier supported by the beam, the said spindle provided with a holder and suitable means of seizing and holding the die to the holder and of quickly releasing the die, and adapted to be used upon the die-bed in any position and upon any part of the surface of the bed. The force instead of being applied directly to the die is applied to the spindle and thence communicated to the holder and die.

In the drawings like letters of reference indicate corresponding parts.

Figure 1 is a sectional elevation of a beam dying-out machine similar to that represented in my Patent No. 368,108, dated August 9, 1887. The present improvement is shown as used and combined with the machine. Fig. 2 is a sectional view of the beam, illustrating the way the carrier is held and moved lengthwise of the beam. Also a sectional view is shown of the bed upon which rests the material to be cut or died out. Fig. 3 is a sectional view of the movable arm, the spindle, and operative parts. Fig. 4 is a plan view of the movable arm, showing the method of arranging the ball-bearings therefor. Fig. 5 is a plan view of one of the dies, with the handle of the die and the arms of the holder provided with the wire for magnetizing the said holder. Fig. 6 is an elevation in section representing the die held by the holder magnetically with the wires and attachments for operating the same. Fig. 7 is a plan view of a die as held by the arms of the holder on line 2 2 of Fig. 6.

Referring to the drawings, E is the beam of the machine; $e$, the rods supporting and which operate the said beam.

A is the swinging arm, supported by the movable carrier $a'$ and which supports the spindle B. On the lower end of the spindle is pivoted or otherwise secured the holder C, which is preferably formed of fingers, as represented in Figs. 5 and 7. The spindle is supported by the arm A and is journaled in the outer bearings, as shown in Fig. 3, and is held at the required height by the spring $b$ and collar $b'$. The collar $b^3$ may also be used, if desired, though not essential. On the spindle-top is preferably placed the adjustable stop $b^4$, thus protecting the end and also enabling the length of the stroke to be nicely adjusted without moving the bed D by means of one or more collars or round metal pieces placed on the spindle and beneath the cap, which sets over the same and holds them in place. The carrier $a'$ is provided with the rollers $a^2$, preferably four in number, two upon each side, and are sustained by the projections or ledges $e'$, formed upon each side of the beam of the machine. On the under side of the beam is placed a roller or pulley $a^3$, which may be made adjustable by any ordinary means. This roller is intended to be placed against the under side of the beam and to act as a tightener, thereby holding the carrier firmly in position.

The arm A is journaled to the carrier $a'$, and the spindle B is journaled in the end of the arm A and held therein by the spring $b$ and the collar $b'$. The holder C is secured to the lower end of the spindle by any suitable means and is formed, preferably, with fingers, as shown in Fig. 5. An opening $b^2$ is formed in the holder for the purpose of accommodating the handle $g$ of the die G. In case dies without the handle $g$ or bail were used there would of course be no need of the aperture $b^2$; but it is preferable that the holder be so made, as then both styles of dies may be used without any change in the holder.

The dies used vary greatly in form and size, and it is therefore necessary that the means for securing the die to the holder be adapted to all kinds, sizes, and forms. This I provide by my peculiar holder and the means described for seizing the dies. In Fig. 6 is shown a die-holder fitted with means of magnetizing the said holder temporarily. About two or more fingers of the holder C, I wind a coil of wire. The wires are connected with any supply of electricity convenient, which is regulated—that is, thrown on and off—by the ordinary switch H, placed on the spindle B. In cases where an electric current is not available for magnetizing the holder I substitute mechanical devices for securing the holder to the dies though an ordinary permanent magnet formed in connection with the holder C may be used for the smaller dies.

It will be observed that the loose connection of the spindle B in the end of the arm A enables the operator to turn the spindle and holder in any direction; also, that the spring $b$, supporting the spindle in the arm A, allows the operator to depress the spindle at will and to place it over the die, securing it thereto, and to also raise and depress the die and adjust it upon the material with great nicety and ease. The movement of the arm enables the die-holder and die to be moved across the bed from side to side, while the movable carrier $a'$ permits a free and ready movement of the arm and the spindle and die-holder lengthwise of the bed. It will thus be seen that my construction allows the greatest latitude for adjusting the die upon the work that is possible within the range of the bed of the machine.

Having now described my improved device, I will describe its mode of operation.

The leather or other material to be died out being placed on the bed D of the machine, a suitable die is selected. The operator presses down the spindle so that the holder C rests upon the die and then moves the switch H, and the die will be securely held to the bottom of the holder. The die is then placed upon the material at the desired point for cutting or dying out and the machine is put in operation. The beam is depressed in the usual manner and the under side strikes upon the top of the spindle B, the arm A sliding down the spindle as the beam descends. The die cuts through the material upon which it has been placed, and the raising of the beam by the operation of the machine raises the spindle B and its die from the work. The die is then readjusted upon the material resting on the bed, and the operation of dying out is continued. In case it becomes necessary to use another die in order that the stock may be more economically died out the switch H is turned, throwing off the electric current, and the die is instantly released. Another die can be substituted, as already described, and the operation of dying out go forward.

A general description of the working of dying-out machines is not deemed necessary, as they are well known.

By my improvement I am enabled to do more work and also enable the operator to perform the necessary adjustment of the dies upon the material with entire safety and ease. Under the usual method of operating a dying-out machine there is danger that the machine may not always stop at each revolution, and when this happens the operator is liable to get his hands and arms caught by the descending beam as it impinges on the top of the die. By reasonable care no person operating a machine of this class provided with my improved device upon any kind of material could possibly be injured by an accidental descending of the beam.

I do not wish to confine myself to the exact form and construction of parts herein set forth, as the details may be varied or modified without departing from the spirit of my invention.

Having now described my invention, what I claim, and desire to secure by Letters Patent of the United States, is—

1. In a machine for cutting leather or other materials, the beam E, provided with the ledges $e'$; the carrier $a'$, having the rolls $a^2$, $a^2$, and tightener $a^3$; the swinging arm A; the spindle B, suitably journaled and supported in the free end of arm A; the holder C, movably secured to the lower end of said spindle and adapted to seize and hold a die, all combined and adapted to operate substantially as and for the purposes set forth.

2. In a machine for cutting leather or other materials, the beam E, the carrier $a'$, suitably secured to said beam; a horizontally-swinging arm journaled to said carrier; a spindle journaled in the outer end of the said arm, and supported by a spring; the adjustable stop $b^4$, adapted to protect the upper end of said spindle and to hold the collars used for adjustment; the holder movably secured to the lower end of the said spindle, all arranged and combined substantially as and for the purposes set forth.

3. In a machine for cutting leather or other materials, the combination of the spindle B; the holder C, having the opening $b^2$, and provided with fingers $x$, suitably coiled with wire around one or more of said fingers; and the switch H, all arranged and adapted to operate substantially as and for the purposes set forth.

4. In a machine for cutting leather or other materials, the combination of a movable beam; an adjustable bed; an arm adapted to swing horizontally in respect to the movement of the said beam, and movably secured to a movable support adapted to travel lengthwise of the said beam; a vertical spindle movably supported in the outer end of the said arm, and a suitable holder suitably secured to the lower end of the said spindle, substantially as and for the purposes set forth.

5. In a machine for cutting leather or other materials, the combination of a vertically-moving beam; a swinging arm adapted to move horizontally in respect to the said beam, the said arm suitably supported by a movable support secured to said beam; a spindle, vertically supported and adapted to move in the outer end of the said arm; a holder suitably secured to the lower end of said spindle and having a suitable wire connection for electrically magnetizing said holder, substantially as and for the purposes set forth.

In testimony whereof I have affixed my signature, in presence of two witnesses, this 3d day of May, A. D. 1898.

HENRY PARSONS.

Witnesses:
   BOWDOIN S. PARKER,
   M. E. HOLMES.